INVENTOR.
Charles F. de Mey II

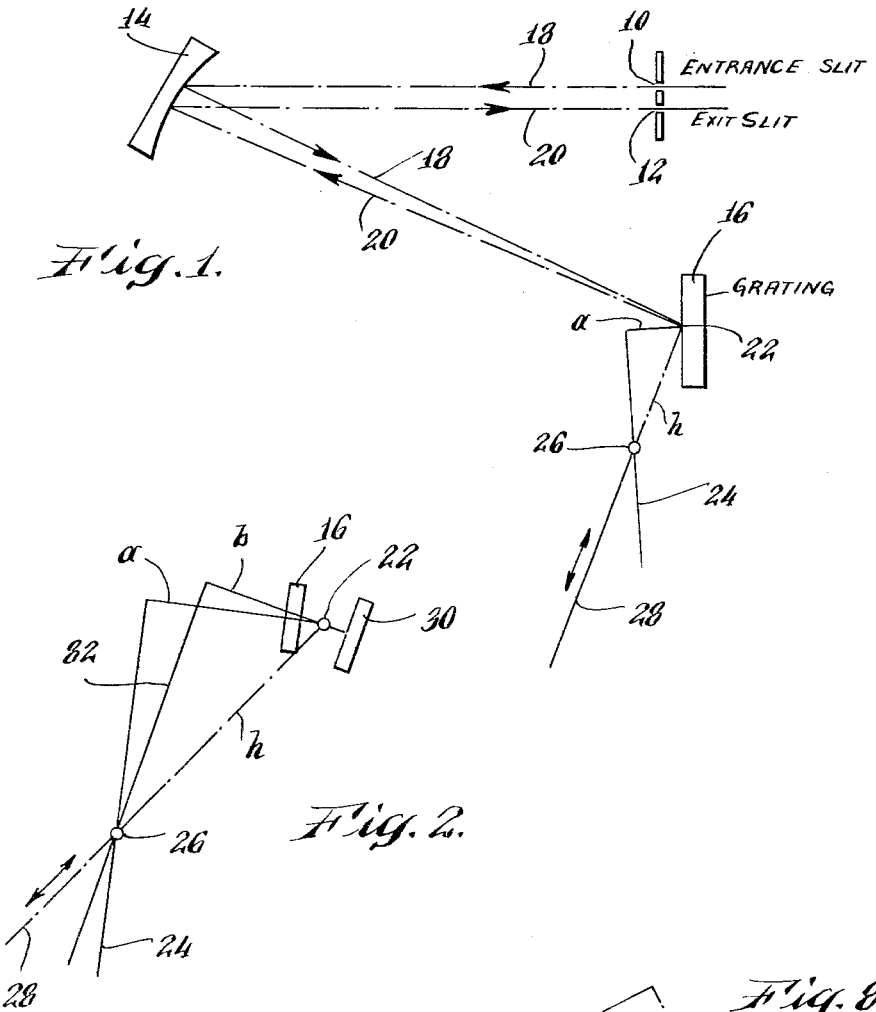
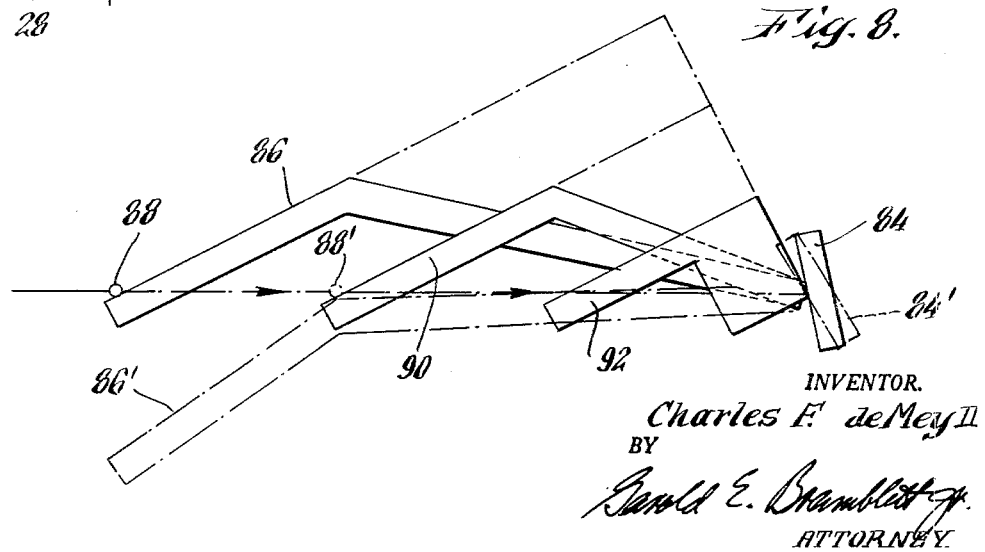

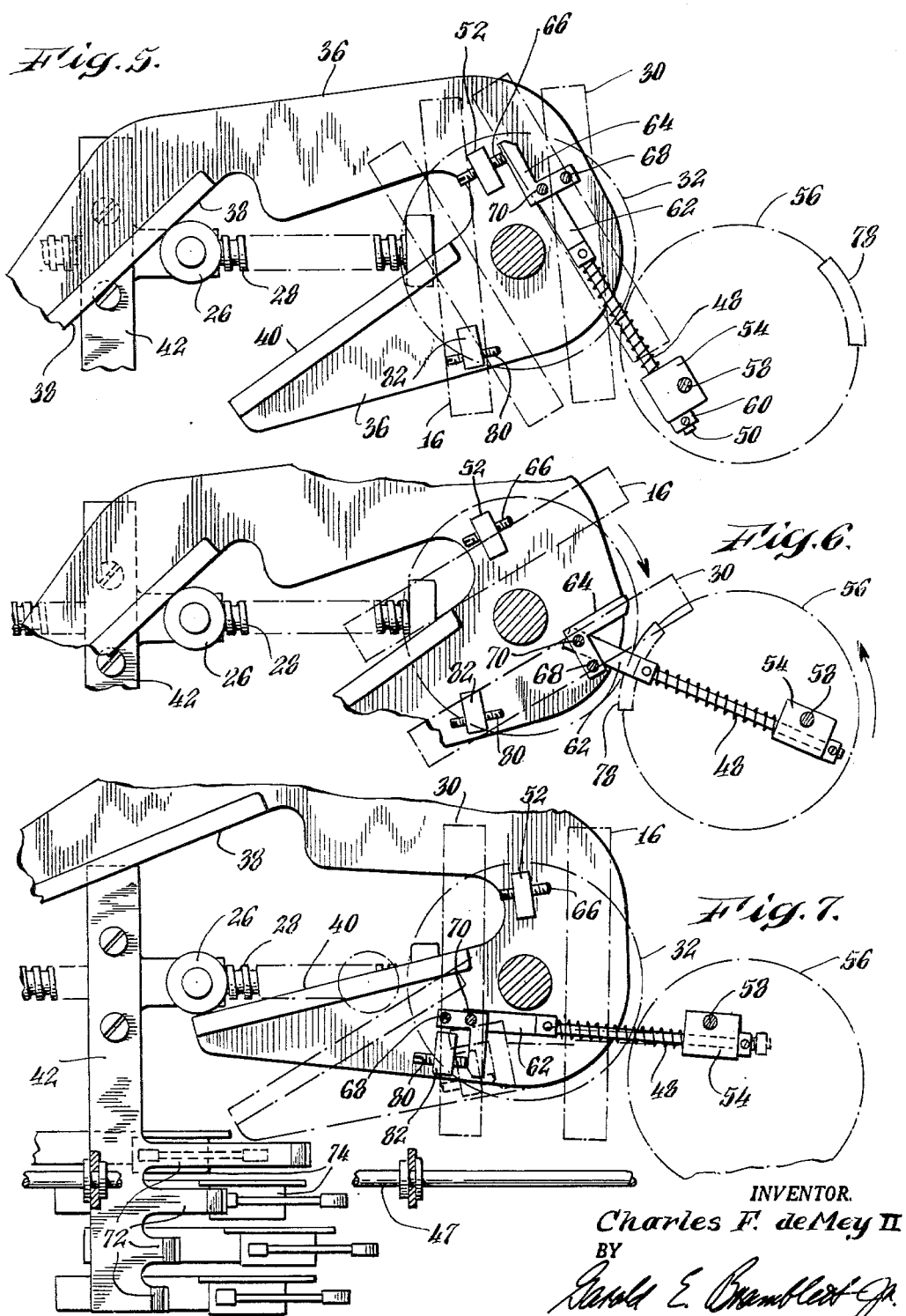

United States Patent Office 3,229,563
Patented Jan. 18, 1966

3,229,563
PLURAL GRATING SCANNING SYSTEM
Charles F. de Mey II, Ridgefield, Conn., assignor to The Perkin-Elmer Corporation, Norwalk, Conn., a corporation of New York
Filed Feb. 27, 1961, Ser. No. 91,845
7 Claims. (Cl. 88—14)

This invention relates to apparatus for rotating a spectrophotometer grating through a scanning angle at a predetermined rate.

In copending patent application Serial Number 91,113 filed February 23, 1961 by Alpert et al. and assigned to the same assignee as the present invention, and now abandoned, there is disclosed a spectrophotometer utilizing a plurality of gratings and a sine-bar control mechanism. The sine-bar is used for rotating a grating at a rate such that the wavelength of the radiation at the exit slit is directly proportional to the displacement of a linearly moving point which has a rate of travel proportional to the time base of a recorder chart.

In accordance with the present invention there is provided a system for presenting the radiation dispersed by any of a plurality of gratings or a plurality of orders of the same grating to an exit slit at a rate such that the wavenumber is directly proportional to the displacement of a linearly moving point. This is accomplished by means of a cosecant function generator for rotating the grating. The particular difficulties which this invention overcomes arise from the fact that multiple functions are involved which require suitable correlation in order to achieve accurate and continuous spectra. For example, a first grating may be rotated through its scanning angle to a suitable "changeover" position. At this position, the first grating is removed from the radiation beam and a second grating is inserted. It would be desirable if the second grating were immediately oriented at the proper angle to give the same wavelengths at the exit slit as the first grating. The problem is further complicated by the fact that the rate of rotation of each grating varies with the number of rulings per linear unit of grating surface.

A somewhat similar problem has existed in the prior art with respect to scanning a single grating in different orders. This has been accomplished by means of a relatively complex mechanism of plural cams or a single cam with a series of different rises.

It is, therefore, the primary object of this invention to provide an improved multiple scanning apparatus for a grating spectrophotometer.

Another object is to provide such an apparatus adapted for use with a grating changeover system.

Another object is to provide such an apparatus wherein the particular changeover point is not critical so that no matching problem results.

Another object is to provide such an apparatus capable of providing any of a plurality of scanning rates.

Another object is to provide such an apparatus whereby a grating may be preadjusted prior to its insertion in the radiation beam.

Another object of this invention is to provide such a system wherein the wavenumber of the output radiation is directly proportional to chart movement.

Other objects, features, and advantages will be apparent from the following description, the appended claims, and the figures of the attached drawings wherein:

FIG. 1 is a schematic representation of a grating monochromator having a cosecant drive;

FIG. 2 is a schematic representation of rotatably mounted gratings having separate cosecant drives;

FIGS. 5–7 illustrate various positions of the apparatus of FIGS. 3 and 4 during the changeover period; and FIG. 8 is a schematic illustration of a variation of this invention designed to rotate a grating for scanning several orders of radiation.

Figure 3:
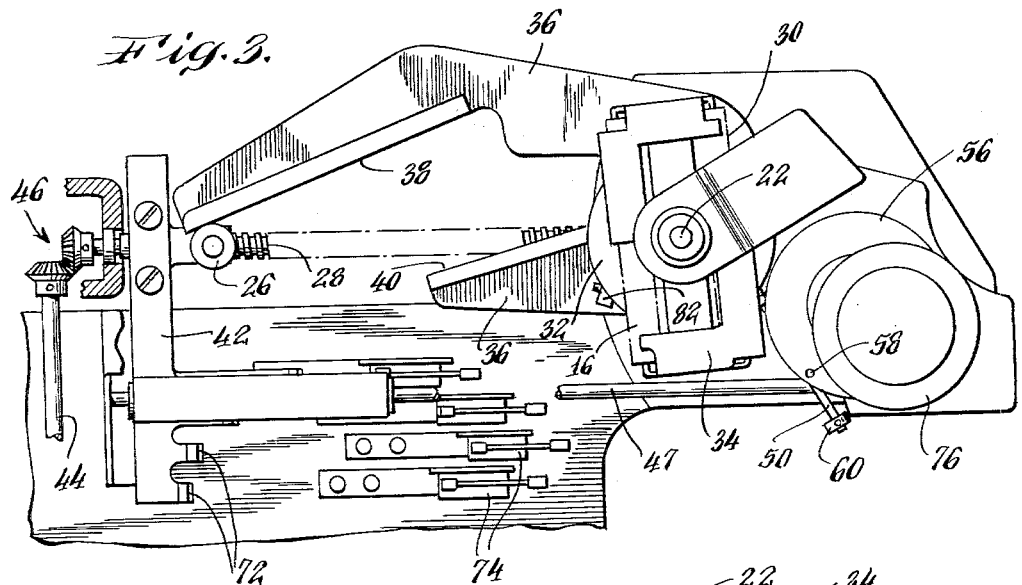
FIG. 3 is a plan view of an apparatus embodying this invention taken along the line 3—3 of FIG. 4.

The theory behind the cosecant function generator will be apparent from an inspection of FIG. 1 illustrating a monochromator having an entrance slit 10, and exit slit 12, a collimating mirror 14, and a rotatable diffraction grating 16. A radiation beam 18 enters the monochromator via the entrance slit, is collimated by mirror 14, and redirected to the surface of the gating 16. Diffracted radiation of the desired wavelength is then reflected as a monochromatic beam 20 from mirror 14 to exit slit 12.

Gating 16 is mounted so as to rotate about a pivot 22 which is the center of rotation of said grating. This may be accomplished by means of a lever arm $a$ having a right angle extension 24. Extension 24 is contacted by a suitable driving stud 26 which is caused to move linearly along a track 28. It will now be seen that the distance $h$ between pivot 22 and stud 26 represents the hypotenuse of a right triangle. As this distance varies, leg $a$ remains fixed in length. Consequently, the cosecant $h/a$ of the acute angle at 26 is always proportional to the travel of stud 26. As the rotation of grating 16 is the same whether affixed to arm $a$ or to extension 24, it will be seen that such rotation bears a cosecant relationship to the distance traveled, $h$.

FIG. 2 illustrates an apparatus similar in principle to that of FIG. 1 but designed to rotate two different gratings. In this embodiment, grating 16 is controlled in exactly the same manner as in FIG. 1. However, there is also a superpositioned mechanism for controlling a second grating 30 by a different cosecant function which is also directly related to $h$. The two cosecant functions are interrelated by a factor that depends upon the ratio of $a/b$. Arm lengths $a$ and $b$ are in ratio of the number of lines per linear unit on the grating surfaces.

The mechanism schematically illustrated in FIG. 2 would be impractical in an actual monochromator. This is due to the fact that the grating occupy different positions in space and would either block radiation from one another or require elaborate optical or mechanical arrangements to be usable.

Figure 4:
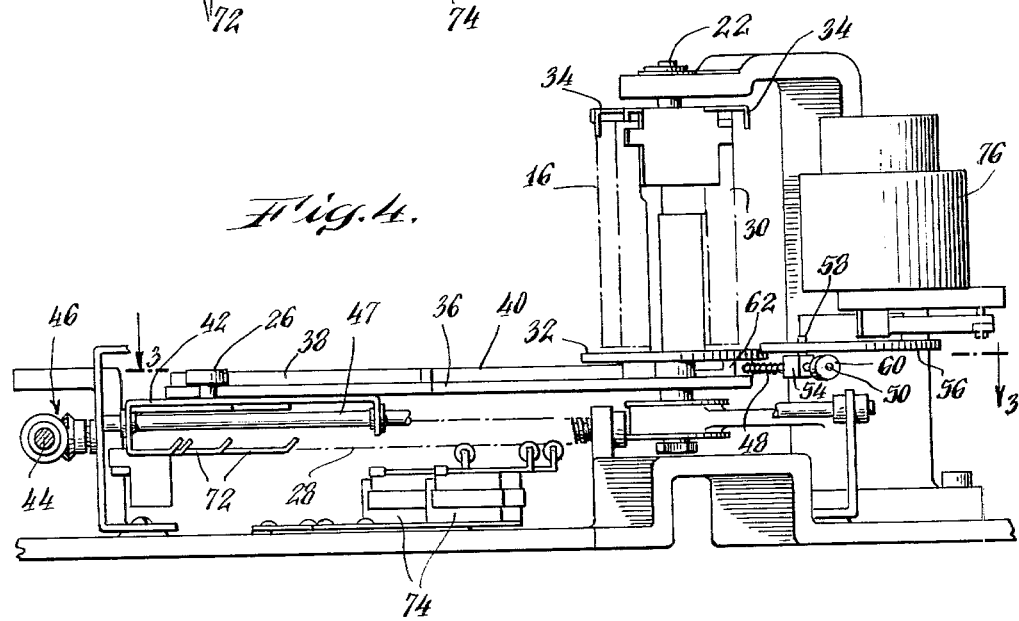
FIG. 4 is an elevational view of the apparatus of FIG. 3.

The novel apparatus of this invention which successfully employs the principle illustrated in FIG. 2 will be apparent from a consideration of FIGS. 3 and 4. These illustrations show a grating mount including a table 32 and clamps 34 for supporting two gratings 16, 30 in back to back relationship. In the illustrated arrangement, grating 16 would be positioned in the radiation beam from a collimating mirror. Table 32 and the associated gratings are rotatable about a vertical shaft 22 constituting the center of rotation of the gratings. In driving relationship to table 32 is a double control member 36. Mounted on member 36 are accurately constructed camming arms 38 and 40. By referring back to FIG. 2 it will be noted that camming arm 38 is the equivalent of extension 24 connected to grating 16 by means of leg $a$. Since member 36 is rigid, it will be seen that the continuation of 24 is always displaced from shaft 22 by an amount which can be called $a$.

A driving stud 26 mounted on a movable carriage 42 is linearly movable by means of a driving screw 28. Screw 28 is controlled by a drive shaft 44 acting through suitable gears 46. It will be apparent that the mechanism thus far described in the functional equivalent of that illustrated in FIG. 1, the distance between stud 26 and shaft 22 being proportional to *h*. A shaft 47 serves as a track in retaining proper alignment of carriage 42.

Contact between table 32 and member 36 is maintained by means of a compression spring 48 held in place by a rod 50 in such a manner as to exert a force between an L-shaped arm 64 on table 32 and a bracket 54 rotatably mounted on a range-change disc 56 by means of an axle pin 58. Fixed to the end of rod 50 is a stop 60. The compressing of the spring forces the rotatable table to follow a bracket 52 on control member 36 in a manner more fully explained infra.

The illustrations of FIGS. 5–7 illustrate the mechanism in more detail and explain the operation of the grating change-over.

By reference to FIG. 5, it will be seen that stud 26 has advanced along screw 28, followed by arm 36 and grating 16 to a point where the grating is no longer usable. Throughout this period, table 32—with its gratings 16, 30—has been forced to follow the movements of stud 26 by means of spring 48 exerting pressure through link 62 and L-shaped arm 64 against an adjusting screw 66 carried in bracket 52. Arm 64 is fixedly secured to table 32 by means of screws 68 and 70. Screw 70 also acts as a pivot between link 62 and arm 64.

When stud 26 reaches the illustrated position, fingers 72 on carriage 42 contact suitable microswitches 74 which actuate range motor 76. Motor 76 drives disc 56 in a counter-clockwise direction (as illustrated in FIGS. 5–7). Bracket 54, abutting against stop 60 causes rod 50 to pull table 32 clockwise, lifting arm 64 away from screw 66. This action continues to the dead-center position illustrated in FIG. 6. At this point a rubber insert 78 on the rim of disc 56 forces table 32 past dead-center. The continued rotation of disc 56 then causes spring 48 to continue the clockwise rotation of table 32 until the positions of gratings 16, 30 are reversed and arm 64 is forced against an adjusting screw 80 contained in a bracket 82 fixed to arm 36 in a manner similar to bracket 52. This forces arm 36 to rotate in a clockwise direction, lifting camming arm 38 from stud 26 and forcing camming arm 40 against the stud.

It will now be seen that the relationship between stud 26, camming arm 40, and grating 30 may be analogized to that existing in FIG. 2 wherein member 82 corresponds to camming arm 40 and the displacement of the continuation of arm 40 from pivot 22 is equivalent to leg *b* of the corresponding triangle. By means of this invention it will be seen that, in effect, two gratings have been simultaneously adjusted so that, at the point of change-over, the new grating is properly aligned with respect to the impinging radiation. Further, each grating is individually controlled by a common drive member so that each rotates in accordance with a different cosecant function. This provides a recording that is linear in wave number.

Still another variation of this invention is illustrated schematically in FIG. 8. In this embodiment a single grating 84 is controlled by three arms offset from the center of rotation by multiples of 1, 2, and 3 times the distance required for first order operation. The third order arm 86 is so designed that when stud 88 reaches position 88′, it will be in position 86′ so that only second order arm 90 is in position when grating 84 has been rotated to 84′. The procedure is then repeated after second order arm 90 has been completely depressed so that only first order arm 92 is effective. The grating, of course, must be repositioned each time a new control arm takes over its operation.

It is to be understood that the foregoing description is illustrative rather than limiting. The invention is limited only by the scope of the following claims.

I claim:

1. Optical grating scanning apparatus comprising rotatable grating mount means, a plurality of gratings on said mount means, operating means to rotate said mount means in accordance with a cosecant function, said operating means comprising a linear actuator, a plurality of camming arms, each camming arm corresponding to one of said plurality of gratings for scanning rotation thereof, means to selectively sequentially engage said camming arms with the linear actuator and means to move said linear actuator along a line passing through the center of rotation of said gratings whereby the corresponding gratings are sequentially rotated through their respective scanning angles.

2. Optical grating scanning apparatus comprising rotatable grating mount means, a plurality of gratings secured on said mount means for rotation through respective scanning angles as the mount means is rotated, operating means to rotate said mount means in accordance with a cosecant function, means interconnecting said rotatable grating mount means and said operating means, said operating means comprising a linear actuator, a plurality of camming arms, each camming arm corresponding to one of said plurality of gratings to effect scanning rotation thereof, means to selectively sequentially engage said camming arms with the linear actuator and means to move said linear actuator along a line passing through the center of rotation of said gratings whereby the corresponding gratings are sequentially rotated through their respective scanning angles.

3. Optical grating scanning apparatus comprising rotatable grating mount means, a plurality of gratings secured on said mount means for rotation through respective scanning angles by rotation of the mount means, operating means to rotate said mount means in accordance with a cosecant law, said operating means comprising a linear actuator, a rotatable member, a plurality of camming arms interconnected with said rotatable member, each camming arm corresponding to one of said plurality of gratings to effect scanning rotation thereof, engaging means to selectively sequentially engage said camming arms with the linear actuator, positioning means to rotate said grating mount means with respect to said rotatable member to selectively position each of said gratings in scanning position, said positioning means being synchronously operable with said engaging means and means to move said linear actuator along a line passing through the center of rotation of said gratings whereby a positioned grating is rotated through its scanning angle by its corresponding camming arm.

4. Optical grating scanning apparatus comprising a plurality of gratings each of which is adapted to provide a different spectral range, operating means connected to rotate each of said gratings through a scanning angle in accordance with a cosecant function, said operating means comprising a linear actuator, a control member having a plurality of camming arms, said control member being mounted for rotation about an axis, said axis being coincident with the axis of rotation of said gratings, a lever arm being defined by the perpendicular distance from said axis to the line defined by each of said camming arms, each of said lever arms being of a different length and corresponding to the spectral range of said gratings, means to move said linear actuator along a line passing through the center of rotation of said gratings and means to selectively sequentially engage said camming arms with the linear actuator to effect rotation of each grating in accordance with the length of the corresponding lever arm.

5. Optical grating scanning apparatus comprising a plurality of gratings each of which is adapted to provide a different spectral range, cosecant operating means connected to rotate each of said gratings through a scanning angle in accordance with a cosecant function, said cosecant operating means comprising a linear actuator, a control member having a plurality of camming arms corresponding in number to said plurality of gratings, said control member being mounted for rotation about an axis, said axis being coincident with the axis of rotation of said gratings, a lever arm being defined by the perpendicular distance from said axis to the line defined by each of said camming arms, each of said lever arms being of a different length and corresponding to the spectral range of said gratings, means to move said linear actuator along a line passing through the center of rotation of said gratings and means to selectively sequentially engage said camming arms with the linear actuator to sequentially rotate each grating through its respective scanning angle.

6. Optical grating scanning apparatus comprising grating means adapted to provide a plurality of different spectral ranges, cosecant operating means connected to rotate said grating means through a plurality of scanning angles in accordance with a cosecant function, said cosecant operating means comprising a linear actuator, a control member having a plurality of camming arms, said control member being mounted for rotation about an axis, said axis being coincident with the axis of rotation of said grating means, a lever arm being defined by the perpendicular distance from said axis to the line defined by each of said camming arms, each of said lever arms being of a different length and corresponding to one of the spectral ranges of said grating means, means to move said linear actuator along a line passing through the center of rotation of said gratings and means to selectively sequentially engage said camming arms with the linear actuator to sequentially rotate the grating means through the respective scanning angles.

7. Optical grating scanning apparatus comprising rotatable grating mount means, grating means secured on said mount means for rotation through respective scanning angles as the mount means is rotated to provide a plurality of spectral ranges, cosecant operating means in accordance with a cosecant law to rotate said mount means, means interconnecting said rotatable grating mount means and said cosecant operating means, said cosecant operating means comprising a linear actuator, a plurality of camming arms, each camming arm corresponding to one of said plurality of spectral ranges, means to move said linear actuator along a line passing through the center of rotation of said gratings and means to selectively sequentially engage said camming arms with the linear actuator whereby the grating means is rotated through the respective scanning angles to provide the said plurality of spectral ranges.

References Cited by the Examiner

UNITED STATES PATENTS

| | | | |
|---|---|---|---|
| 2,670,652 | 3/1954 | Sherman | 88—14 |
| 2,750,836 | 6/1956 | Fastie | 88—14 |
| 2,931,266 | 4/1960 | Martin | 88—14 |

JEWELL H. PEDERSEN, *Primary Examiner.*

EMIL G. ANDERSON, *Examiner.*